Aug. 22, 1933.  J. A. SHAFER  1,923,120
SAFETY SUPPORT FOR BRAKE BEAMS
Filed Aug. 23, 1932   2 Sheets-Sheet 1
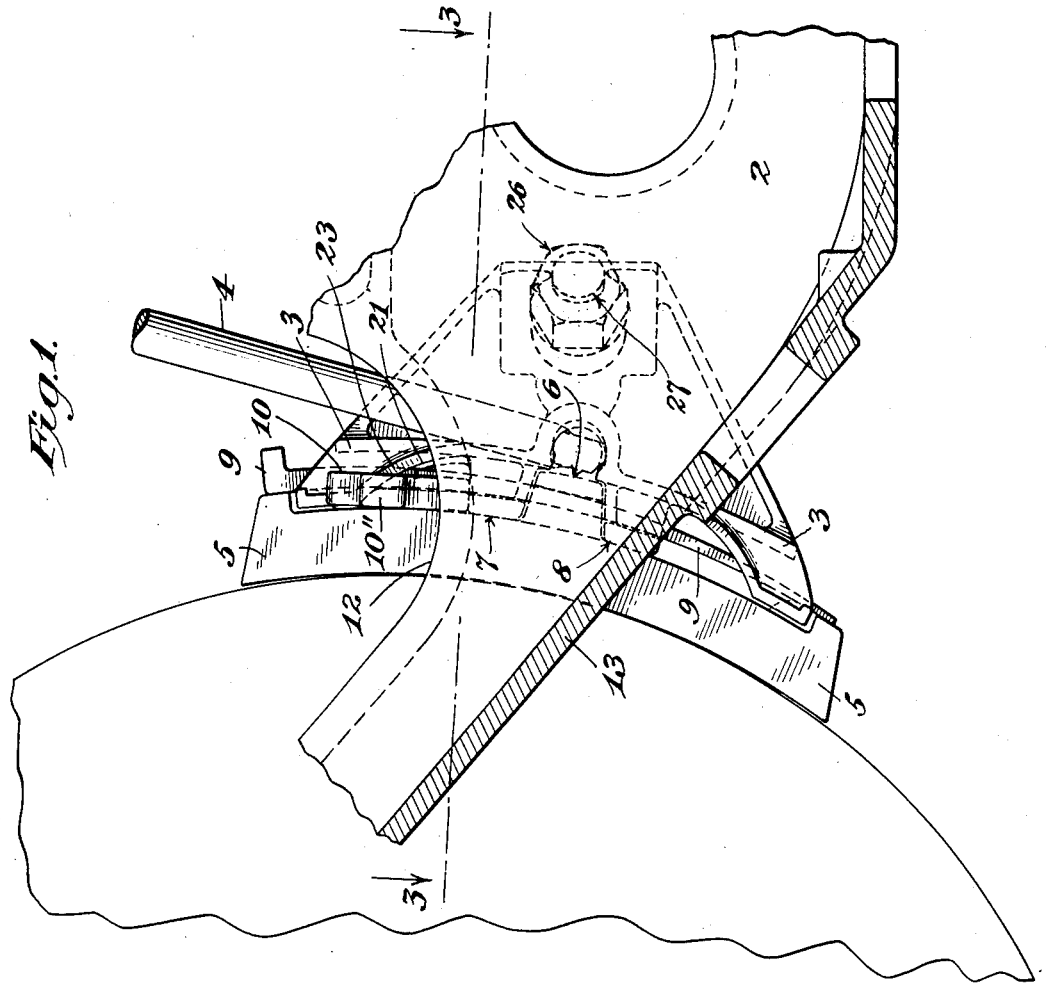
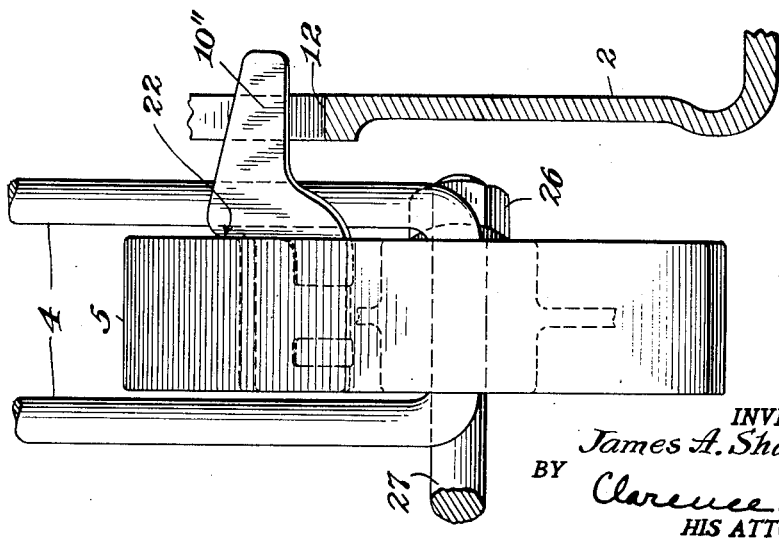
INVENTOR
James A. Shafer
BY
HIS ATTORNEY Aug. 22, 1933.   J. A. SHAFER   1,923,120
SAFETY SUPPORT FOR BRAKE BEAMS
Filed Aug. 23, 1932   2 Sheets-Sheet 2
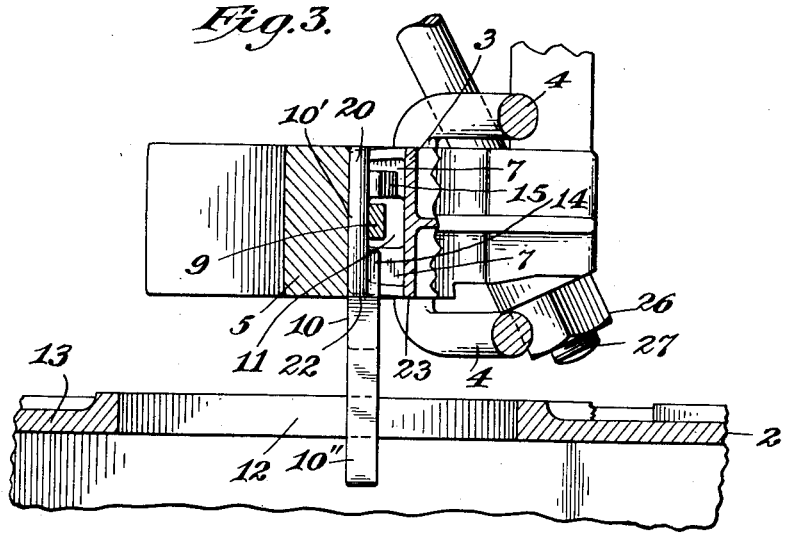
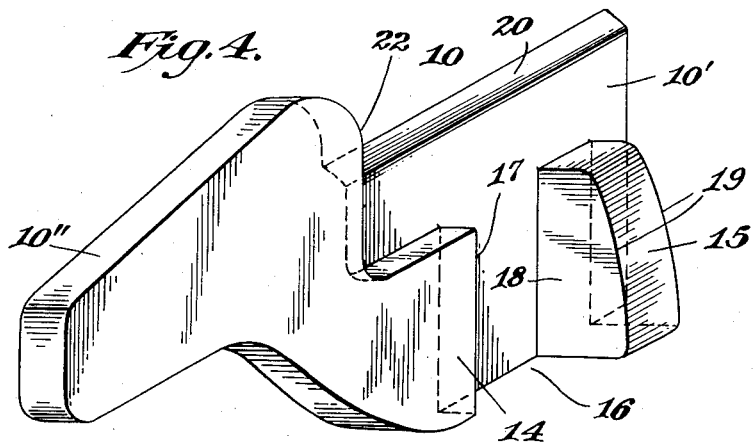
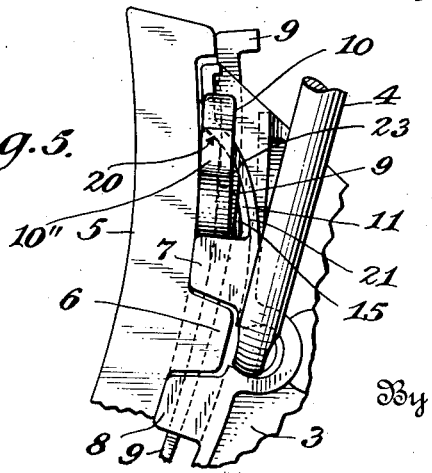
Inventor
James A. Shafer
By his Attorney Patented Aug. 22, 1933

1,923,120

UNITED STATES PATENT OFFICE 1,923,120

SAFETY SUPPORT FOR BRAKE BEAMS

James A. Shafer, East Cleveland, Ohio, assignor to National Malleable and Steel Castings Company, Cleveland, Ohio, a Corporation of Ohio Application August 23, 1932. Serial No. 630,038

14 Claims. (Cl. 188—210)

This invention has for its prime object the provision of improved means for supporting brake beams in the event of failure of the hangers by which they are normally supported. The invention in this connection comprises novel means, simple in construction and effective and reliable in operation, for serving as a brake beam safety support. Further features of the invention will be more specifically pointed out in the ensuing specification and in the claims hereto appended.

In the accompanying drawings:

Figure 1 is a view, partly in side elevation and partly in vertical section, of a portion of a car truck equipped with an embodiment of my invention.

Figure 2 is a view in end elevation, with the side frame in vertical section.

Figure 3 is a horizontal sectional view on line 3—3 of Figure 1.

Figure 4 is a perspective view of a detail, on an enlarged scale.

Figure 5 is a fragmentary detail side elevational view of parts shown in Figure 1, with the side frame removed.

Referring to the drawings, there is shown at 2 a portion of a car truck side frame of any suitable or known type, from which a brake head 3 is suspended by a hanger 4 in the well-known manner, said head forming a part of a standard or conventional brake beam as is well understood. The brake shoe 5 has a projection 6, which fits between projections 7 and 8 of the brake head, all of said projections having openings for the reception of an elongated key 9 for retaining the shoe in position on the head. The brake head, shoe, and key aforesaid are of standard construction and need not be further specifically described.

In carrying out my invention, I provide a member 10 which fits in an opening 11 between the brake head 3 and shoe 5 and projects laterally outwardly therefrom into a position above the upper edge 12 of the side frame tension member 13. The lower edge of said member 10 rests upon the top of the lug or projection 7 of the brake head. Said member 10 comprises a body portion 10' from which extend spaced projections 14, 15 having a recess 16 therebetween. Said recess 16 provides for the passage of the key 9, the sides 17, 18 of said projections being adapted, through engagement with said key, to limit lateral movement of said member 10. The surface 19 of projection 15, and the surface 20 of the body portion 10' of member 10 are shaped to conform generally to the outline of the surface 21 forming the boundary of the opening 11 in the brake head. It will be seen that as the key 9 is driven into place and the brake shoe and brake head are forced toward each other the member 10 is forced downwardly and toward the brake shoe, due to the wedging action of surface 20 and the cooperating brake head surface 21 with which it engages. Member 10 is thereby held rigidly in position and is precluded from rattling. If desired, the surface 19 may engage surface 21 snugly, and the projections 14, 15 may likewise, if desired, be spaced so closely as to engage tightly the key 9. However, the wedging engagement above described between surfaces 20 and 21 is sufficient to hold the member 10 firmly in place in the absence of excessive wear, and clearance may be provided, as shown, between said surfaces 19 and 21, and between projections 14, 15, and the key 9. Should play develop between the engaging surfaces of member 10 and the brake head as the result of unduly prolonged wear, the member 10 will be prevented by lugs 14 and 15 from dropping entirely out of position.

It will be noted that the portion 10'' of the member 10 which overlies the flange or edge 12 of the side frame tension member is off-set upwardly to provide for clearance between its lower edge and said flange. The shoulder 22 of member 10, formed as a result of said off-set, engages the side 23 of the brake head and may thus serve to limit lateral movement of member 10 in one direction when play is provided between the key 9 and the projections 14, 15.

It will be seen that if, in the construction above described, the hanger 4 should break, the dropping of the brake head and associated brake beam upon the track will be prevented by the engagement of the projecting portion 10'' of member 10 with the flange or edge 12 of tension member 13 of the side frame. The arrangement above described thus provides an effective safety support for brake beams. The embodiment above described is further particularly simple and adapted for cooperation with a standard brake head, shoe, and key without any change in the construction of these parts.

It will be noted that the member 10 can be removed for repairs with marked facility, it being necessary merely to withdraw the key 9 to free said member for removal.

It will, of course, be understood that each of the brake heads of the truck is intended to have a member 10 applied thereto in the manner above set forth.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a car truck, a side frame, a brake shoe, a brake head carrying said shoe, a hanger supporting said head, and means interposed between said shoe and said head and extending laterally therefrom into engageable relation with a portion of the truck for supporting said head in the event of failure of said hanger.

2. In a car truck, a side frame, a brake shoe, a brake head carrying said shoe, a key engaging said shoe and head for retaining the shoe in position on said head, a hanger supporting said head, and means interposed between said shoe and said head and extending laterally therefrom into engageable relation with a portion of the truck for supporting said head in the event of breakage of said hanger, and means cooperating with said key for preventing lateral withdrawal of said first mentioned means from said head.

3. In a car truck, a side frame, a brake shoe, a brake head carrying said shoe, said shoe and said head having interengaging projections, a key passing through said projections for retaining said shoe in position on said head, and means comprising a member mounted on one of said projections and extending laterally from said head into engageable relation with a portion of the truck for supporting said head in the event of breakage of said hanger.

4. In a car truck, a side frame, a brake shoe, a brake head carrying said shoe, said shoe and said head having interengaging projections, a key passing through said projections for retaining said shoe in position on said head, and means comprising a member mounted on one of said projections and extending laterally from said head into engageable relation with a portion of the truck for supporting said head in the event of breakage of said hanger, said member having means projecting therefrom into cooperative relation with said key for preventing lateral withdrawal of said member from said head.

5. In a car truck, a side frame, a brake head, a hanger supporting said head, a member mounted in a recessed portion of said head and projecting laterally therefrom into engageable relation with a portion of said truck for supporting said head in the event of failure of said hanger, and a key in said head controlling retention and withdrawal of said member.

6. In a car truck, a side frame, a brake head, a hanger supporting said head, a member mounted in a recessed portion of said head and extending laterally therefrom into engageable relation to a portion of said truck for supporting said head in the event of failure of said hanger, said member having spaced projections thereon providing a recess therebetween, and a key extending through said recess for retaining said member in position on said head.

7. In a car truck, a side frame, a brake shoe, a brake head carrying said shoe, a hanger supporting said head, said shoe and said head having interengaging projections, a key passing through said projections for retaining said shoe in position on said head, a member mounted on one of the projections of said shoe and extending laterally therefrom into engageable relation with a portion of the truck for supporting said head in the event of failure of said hanger, said member having projecting means engageable with said key for preventing withdrawal of the member from said head.

8. In a car truck, a side frame, a brake head, a hanger supporting said head, said head having a recessed portion defined by a curved wall and a lug, a member mounted in said recess on said lug and having a portion conforming to said wall for engagement therewith, means preventing lateral withdrawal of said member from said head, said member having a portion extending laterally beyond said head into engageable relation to a portion of the truck for supporting said head in the even of failure of said hanger.

9. In a car truck, a side frame, a brake head, a hanger supporting said head, said head having a recessed portion defined by a curved wall and a lug, a member mounted in said recess on said lug and having a portion conforming to said wall for engagement therewith, means preventing lateral withdrawal of said member from said head, said member having a portion extending laterally beyond said head into engageable relation to a portion of the truck for supporting said head in the event of failure of said hanger, said laterally extending portion of said member being off-set upwardly to provide clearance between the same and said portion of said truck, and said member having a shoulder engageable with the side of said brake head to limit lateral movement of said member with respect to said head.

10. In a car truck, a side frame, a brake head, a hanger supporting said head, said head having a recessed portion defined by a lug on said head and an inclined wall, a member mounted on said lug and having a portion thereof shaped for engagement with said wall, said member comprising a portion extending laterally beyond the head into engageable relation with a portion of the side frame for supporting the head in case of failure of said hanger, a shoe having a lug engaging said lug on said head, said member being positioned between said head and said shoe, said member having a recessed portion, and a key cooperating with said lugs on said head and shoe for retaining the shoe in position on said head, said key cooperating with a portion of said member for preventing lateral withdrawal of the latter from said head.

11. In a car truck, a side frame, a brake head, a hanger supporting said head, said head having a recessed portion defined by a lug on said head and an inclined wall, a member mounted on said lug, said member comprising a portion extending laterally beyond the head into engageable relation with a portion of the side frame for supporting the head in case of failure of said hanger, a shoe having a lug engaging said lug on said head, said member being positioned between said head and said shoe, said member having a recessed portion, and a key cooperating with said lugs on said head and shoe for retaining the shoe in position on said head, said member having spaced projections providing a recess for the passage of said key, one of said projections having a surface conforming to said wall.

12. In a car truck, a side frame, a brake head, a hanger supporting said head and means extending from the interior of said head to the exterior thereof and overlying a portion of said side frame for supporting said head in the event of failure of said hanger.

13. In a car truck, a side frame, a brake shoe, a brake head carrying said shoe, a key for retaining said shoe on said head, a hanger supporting said shoe, and means retained on said head by said key and projecting into engageable relation wtih a portion of the truck for supporting said head in the event of failure of said hanger.

14. In a car truck, a side frame, a brake head, a hanger supporting said head, means on said head and projecting into engageable relation with a portion of the truck for supporting said head in the event of failure of said hanger, and a removable key cooperating with said head and said means for retaining the latter on said head.

JAMES A. SHAFER.